(12) United States Patent
Tanaka et al.

(10) Patent No.: US 9,650,527 B2
(45) Date of Patent: May 16, 2017

(54) WATER-BASED INK FOR INK-JET RECORDING, INK CARTRIDGE, AND INK-JET RECORDING METHOD

(71) Applicant: Brother Kogyo Kabushiki Kaisha, Nagoya-shi, Aichi-ken (JP)

(72) Inventors: Hiroyuki Tanaka, Inazawa (JP); Mitsunori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/078,212

(22) Filed: Mar. 23, 2016

(65) Prior Publication Data

US 2016/0289472 A1    Oct. 6, 2016

(30) Foreign Application Priority Data

Mar. 31, 2015   (JP) .................. 2015-073801

(51) Int. Cl.
| | |
|---|---|
| G01D 11/00 | (2006.01) |
| B41J 2/17 | (2006.01) |
| C09D 11/00 | (2014.01) |
| C09D 11/322 | (2014.01) |
| C09D 11/106 | (2014.01) |
| C09D 11/38 | (2014.01) |

(52) U.S. Cl.
CPC .......... *C09D 11/322* (2013.01); *C09D 11/106* (2013.01); *C09D 11/38* (2013.01)

(58) Field of Classification Search
CPC ....... C09D 11/30; C09D 11/322; C09D 11/40; C09D 11/38; C09D 11/32; C09D 11/54; C09D 11/326; B41M 5/5254; B41M 5/0023; B41J 2/2107; B41J 2/01; B41J 11/002
USPC ............ 347/95, 100; 106/31.13, 31.89, 31.6, 106/31.28
See application file for complete search history.

(56) References Cited

U.S. PATENT DOCUMENTS

| | | | |
|---|---|---|---|
| 5,609,671 A | 3/1997 | Nagasawa | |
| 5,837,045 A | 11/1998 | Johnson et al. | |
| 7,819,962 B2 | 10/2010 | Gu | |
| 7,922,805 B2 | 4/2011 | Kowalski et al. | |
| 7,981,947 B2 * | 7/2011 | Yatake | C09D 11/322 347/100 |
| 8,016,404 B2 | 9/2011 | Kato et al. | |
| 8,858,695 B2 | 10/2014 | Gu et al. | |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0241398 A1 | 10/2008 | Kato et al. | |
| 2009/0229489 A1 | 9/2009 | Gu | |

(Continued)

FOREIGN PATENT DOCUMENTS

| | | |
|---|---|---|
| JP | H08-003498 A | 1/1996 |
| JP | 2000-513396 A | 10/2000 |
| JP | 2004-231711 A | 8/2004 |

(Continued)

*Primary Examiner* — Jannelle M Lebron
(74) *Attorney, Agent, or Firm* — Banner & Witcoff, Ltd.

(57) ABSTRACT

A water-based ink for ink-jet recording includes a pigment; water; at least one of a water-soluble resin having an aryl group and a water-dispersible resin having the aryl group; and a micelle-forming compound having the aryl group and an oxyethylene chain.

17 Claims, 3 Drawing Sheets

(56) References Cited

U.S. PATENT DOCUMENTS

2014/0210900 A1* 7/2014 Ohashi ................ C09D 11/322
                                                    347/20
2016/0075880 A1    3/2016 Gu et al.

FOREIGN PATENT DOCUMENTS

| JP | 2008-524400 A | 7/2008 |
| JP | 2008-231219 A | 10/2008 |
| JP | 2008-246821 A | 10/2008 |
| JP | 2009-515007 A | 4/2009 |
| JP | 2011-515535 A | 5/2011 |

* cited by examiner

WATER-BASED INK FOR INK-JET RECORDING, INK CARTRIDGE, AND INK-JET RECORDING METHOD

CROSS REFERENCE TO RELATED APPLICATION

The present application claims priority from Japanese Patent Application No. 2015-073801 filed on Mar. 31, 2015, the disclosure of which is incorporated herein by reference in its entirety.

BACKGROUND OF THE INVENTION

Field of the Invention

The present invention relates to a water-based ink for ink-jet recording, an ink cartridge, and an ink-jet recording method.

Description of the Related Art

As inks used for ink-jet recording, water-based pigment inks having a pigment and water have been suggested (Japanese Patent Application laid-open No. 2004-231711). The ink-jet recording using the water-based pigment ink, however, has a problem in which the fixation performance to glossy paper is not good.

SUMMARY OF THE INVENTION

Inkjet recording apparatuses have been widely used in offices, companies, and the like in recent years, and there has been growing the demand for a recording matter recorded by the ink-jet recording apparatus which is less likely to get dirty even if being rubbed. Under these circumstances, the water-based pigment ink, is required to have a good fixation performance to glossy paper.

In view of the above, an object of the present teaching is to provide a water-based ink for ink-jet recording which has a good fixation performance to glossy paper.

According to a first aspect of the present teaching, there is provided a water-based ink for ink-jet recording including: a pigment; water; at least one of a water-soluble resin having an aryl group and a water-dispersible resin having an aryl group; and a micelle-forming compound having an aryl group and an oxyethylene chain.

According to a second aspect of the present teaching, there is provided an ink cartridge which includes the water-based ink for ink-jet recording as defined in the first aspect.

According to a third aspect of the present teaching, there is provided an ink-jet recording method including discharging a water-based ink for ink-jet recording on a glossy paper in accordance with an ink-jet system to perform recording, wherein the water-based ink for ink-jet recording is the water-based ink for ink-jet recording as defined in the first aspect.

DESCRIPTION OF THE EMBODIMENTS

Figure 1A:
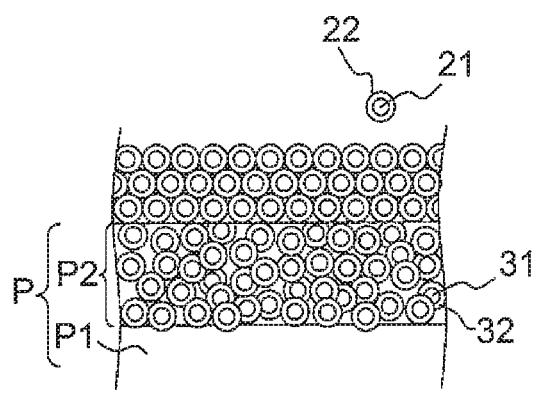
FIGS. 1A to 1C each illustrate an exemplary assumed mechanism about the improvement of fixation performance to glossy paper according to the present teaching.

It is preferred that a recording medium, for which recording is performed by using a water-based ink for ink-jet recording of the present teaching (hereinafter also referred to as "water-based ink" or "ink" in some cases), be glossy paper. The glossy paper means, for example, recording paper in which at least not less than one coating layer(s) is/are formed on its recording surface. The coating layer(s) is/are made of silica particles, alumina particles, or the like. Examples of the glossy paper include photo glossy paper "BP61G" "BP71G" and "BP71GA4" manufactured by BROTHER KOGYO KABUSHIKI KAISHA; ink-jet paper "Kassai" Photo-finish Pro manufactured by FUJI FILM CORPORATION; and highest grade glossy paper "PWRA4-20" manufactured by KODAK JAPAN LTD. The average of diameter sizes of typical voids of the coating layer of the glossy paper is in a range of about 10 nm to about 50 nm.

An explanation will be made about the water-based ink of the present teaching. The water-based ink of the present teaching contains a pigment and water.

The pigment is not particularly limited and includes, for example, carbon black, inorganic pigment, and organic pigment. The carbon black includes, for example, furnace black, lamp black, acetylene black, and channel black. The inorganic pigment includes, for example, titanium oxide, iron oxide-based inorganic pigment, and carbon black-based inorganic pigment. The organic pigment includes, for example, azo-pigments such as azo lake, insoluble azo-pigment, condensed azo-pigment, chelate azo-pigment and the like; polycyclic pigments such as phthalocyanine pigment, perylene and penmen pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; and aniline black daylight fluorescent pigment. Other pigments are also usable provided that the pigments are dispersible in the water phase. The pigments are exemplified, for example, by C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224, and 238; C. I. Pigment Violets 19 and 196; C. I. Pigment Blues 1, 2, 3, 15, 15:1, 15:2, 15:3, 15:4, 16, 22, and 60; C. I. Pigment Greens 7 and 36; solid solutions of the above-listed pigments; and the like. The water-based ink of the present teaching may be a resin-dispersible pigment ink in which the pigment is dispersed in water with a dispersant. As the dispersant, it is allowable to use, for example, any general polymeric dispersant (pigment dispersing resin). Alternatively, the pigment contained in the water-based ink of the present teaching may be subjected to polymer capsulation.

The pigment may be a self-dispersible pigment. Namely, the water-based ink of the present teaching may be a self-dispersible pigment ink in which the self-dispersible pigment is used as the pigment. The self-dispersible pigment is dispersible in water without using any dispersant, for example, owing to the fact that at least one of the hydrophilic functional group and the salt thereof including, for example, carbonyl group, hydroxyl group, carboxylic acid group, sulfonic acid group (sulfonate group), and phosphoric acid group (phosphate group) is introduced into the surfaces of the pigment particles by the chemical bond directly or with any group intervening therebetween. It is possible to use self-dispersible pigments subjected to the surface treatment by any one of methods described, for example, in Japanese Patent Application Laid-open No. HE18-3498 (corresponding to U.S. Pat. No. 5,609,671), Published Japanese Translation of PCT international Publication for Patent Application No. 2000-513396 (corresponding to U.S. Pat. No. 5,837,045), Published Japanese Translation of PCT International Publication for Patent Application No. 2008-524400 (corresponding to United States Patent Application Publication No. US 2006/0201380), Published Japanese Translation of PCT International Publication for Patent Application No. 2009-515007 (corresponding to United States Patent Application Publications No. US 2007/0100023 and No. US 2007/0100024), and Published Japanese Translation of PCT International Publication for Patent Application No. 2011-515535 (corresponding to United States Patent Application Publication No. US 2009/0229489). It is possible to use, as a material for the self-dispersible pigment, either one of the inorganic pigment and the organic pigment. Further, a pigment which is suitable for the above-described treatment includes, for example, carbon black such as "MA8" and "MA100" produced by Mitsubishi Chemical Corporation. As the self-dispersible pigment, it is possible to use, for example, a commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAM-JET (trade name) 470Y" produced by Cabot Corporation; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink SC Holdings Co., Ltd.

The solid content blending amount of the pigment (pigment solid content amount) in the entire amount of the water-based ink is not particularly limited, and may be appropriately determined based on desired optical density, color (hue, tint), or the like. The pigment solid content amount is, for example, in a range of 0.1% by weight to 20% by weight, is preferably in a range of 1% by weight to 15% by weight, and is more preferably in a range of 2% by weight to 10% by weight.

The water-based ink may or may not contain another colorant such as a dye, in addition to the pigment. Note that the effect of the present teaching is such that the water-based pigment ink using the pigment as the colorant has a better fixation performance to glossy paper. Thus, the ratio of the pigment in the colorant is preferably in a range of 90% by weight to 100% by weight, more preferably in a range of 98% by weight to 100% by weight.

The water is preferably ion-exchanged water or pure water (purified water). The blending amount of the water in the entire amount of the water-based ink (the proportion of the water in the water-based ink) is, for example, in a range of 10% by weight to 90% by weight, and preferably in a range of 40% by weight to 80% by weight. The proportion of the water in the water-based ink may be, for example, a balance of the other components.

As described above, the water-based ink further contains at least one of a water-soluble resin having an aryl group and a water-dispersible resin having an aryl group (hereinafter to be referred to as "resin" in some cases); and a micelle-forming compound having an aryl group and an oxyethylene chain.

Any resin may be used as at least one of the water-soluble resin and the water-dispersible resin, provided that the resin contains the aryl group. It is preferred that acrylic resin or styrene acrylic resin be used as at least one of the water-soluble resin and the water-dispersible resin.

The weight average molecular weight of the resin is preferably 5,000 or more, more preferably 7,000 or more. When the weight average molecular weight of the resin is 5,000 or more, the water-based ink having a better fixation performance to glossy paper can be obtained. The reason thereof is assumed that the resin of which weight average molecular weight is 5,000 or more contributes to fix pigment particles onto the glossy paper. The present teaching, however, is not limited to this assumption. When the water-soluble resin is used as the resin, the weight average molecular weight of the water-soluble resin is preferably 50,000 or less, more preferably 20,000 or less to prevent the increase in viscosity of the water-based ink. When the water-dispersible resin is used as the resin, the average particle size of the water-dispersible resin is preferably not more than 200 nm, more preferably not more than 150 nm to prevent jetting characteristics of the water-based ink from being adversely affected. The average particle size of the water-dispersible resin can be measured as, for example, the arithmetic mean diameter by using a dynamic light scattering type particle diameter distribution measuring apparatus "LB-550" produced by HORIBA, Ltd.

The resin may be prepared privately or independently, or any commercially available product may be used for the resin. Examples of the commercially available product include "JOHNCRYL (trade name) 537" (acrylic resin), "JOHNCRYL (trade name) 450" (styrene acrylic resin), and "JOHNCRYL (trade name) 60" (acrylic resin) produced by BASF Corporation; and "RS-1191" (styrene acrylic resin), "US-1071" (styrene acrylic resin), "US-1243" (styrene-maleic acid resin), and "X-200" produced by SEIKO PMC CORPORATION. In the water-based ink, the resin may be a binder resin or a pigment dispersing resin.

The acid value of the resin is, for example, not less than 20 mgKOH/g, preferably not less than 100 mgKOH/g. Using the resin of which acid value is not less than 100 mgKOH/g results in the water-based ink having a better fixation performance to glossy paper. The reason thereof is assumed as follows. Namely, the resin having a high acid value, i.e., having many carboxyl groups has high hydrophilicity, and thus molecules in the water-based ink are easy to be mutually entangled. This helps to form a film. The present teaching, however, is not limited to this assumption. Of the above-described commercially available products, "JOHNCRYL (trade name) 450" (styrene acrylic resin), "JOHNCRYL (trade name) 60" (acrylic resin), and the like are examples of the resin of which acid value is not less than 100 mgKOH/g. The upper limit of the acid value of the resin is not particularly limited, and it is, for example, not more than 400 mgKOH/g.

The minimum film-forming temperature of the resin is, for example, not more than 80° C., preferably not more than 50° C. Using the resin of which minimum film-forming temperature is not more than 50° C. results in the water-based ink having a better fixation performance to glossy paper. Of the above-described commercially available products, "JOHNCRYL (trade name) 537" produced by BASF Corporation and the like is an example of the resin of which minimum film-forming temperature is not more than 50° C.

The lower limit of the minimum film-forming temperature of the resin is not particularly limited, and it is for example, not less than 0° C. The minimum film-forming temperature of each of the above commercially available products is described as follows: "JOHNCRYL (trade name) 537" (the minimum film-forming temperature: 42° C.), and "JOHN-CRYL (trade name) 450" (the minimum film-forming temperature: 5° C.) produced by BASF Corporation. In general, the minimum film-forming temperature is a temperature required to form a film of the water-dispersible resin forming emulsion. Meanwhile, the water-soluble resin can form a film even at a low temperature (for example, 0° C.). The water-soluble resin is exemplified, for example, by "JOHN-CRYL (trade name) 60" produced by BASF Corporation. In the present description, not only the water-dispersible resin but also the water-soluble resin which can form a film at a low temperature is defined to be included in "the resin of which minimum film-forming temperature is not more than 50° C.".

In view of the jetting stability, it is preferred that the resin be a resin (water-dispersible resin) forming emulsion which is less likely to thicken in the ink. Such a resin is exemplified, for example, by "JOHNCRYL (trade name) 537" (acrylic resin, average particle size: 70 nm), and "JOHN-CRYL (trade name) 450" (styrene acrylic resin, average particle size: 60 nm) produced by BASF Corporation, of the above-described commercially available products. In view of the preservation stability, it is preferred that the resin be the water-soluble resin. Such a resin is exemplified, for example, by "JOHNCRYL (trade name) 60" (acrylic resin, weight average molecular weight: 8,500) produced by BASF Corporation, of the above-described commercially available products.

It is allowable that only one kind of the resin is used singly, or two or more kinds of the resins are used in combination. The water-based ink may contain only the water-soluble resin as the resin, or may contain only the water-dispersible resin as the resin. The water-based ink may both water-soluble resin and water-dispersible resin as the resin. The solid content blending amount of the resin in the entire amount of the water-based ink is, for example, in a range of 0.5% by weight to 10% by weight, is preferably in a range of 1% by weight to 5% by weight, and is more preferably in a range of 2% by weight to 4% by weight.

The micelle-forming compound is not particularly limited, provided that the compound can form micelles in the water-based ink. It is preferred that the micelle-forming compound contain a compound represented by the formula (1):

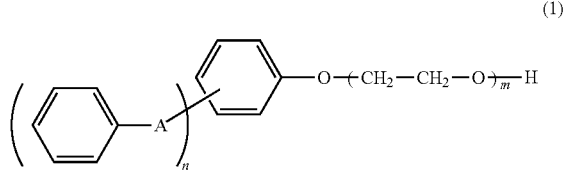

(1)

in the formula (1),
A is a single bond or a straight or branched chain alkylene group having 1 to 10 carbon atoms;
m is an integer in a range of 10 to 100; and
n is an integer in a range of 1 to 5.
In the formula (1), A is preferably a straight or branched chain alkylene group having 1 to 3 carbon atoms, m is an integer in a range of 10 to 75, and n is an integer in a range of 1 to 3. In the formula (1), A is more preferably a group represented by the formula (2), m is an integer in a range of 10 to 50, and n is 2.

$$—CH(CH_3)—\qquad(2)$$

In the formula (1), A may be ethylene group, m may be an integer in a range of 40 to 80, and n may be an integer in a range of 1 to 3.

The compound represented by the formula (1) is exemplified, for example, by nonionic surfactants "EMULGEN (trade name) A-60" (polyoxyethylene distyrenated phenyl ether, n=2, cloud point of 61° C., HLB value of 12.8), "EMULGEN (trade name) A-90" (polyoxyethylene distyrenated phenyl ether, n=2, cloud point of 90° C., HLB value of 14.5), "EMULGEN (trade name) A-500" (polyoxyethylene distyrenated phenyl ether, n=2, cloud point>100° C., HLB value of 18.0), and "EMULGEN (trade name) B-66" (polyoxyethylene tribenzyl phenyl ether, n=3, cloud point of 66° C., HLB value of 13.2) produced by Kao Corporation; and nonionic surfactants "NOIGEN (trade name) EA-87" (polyoxyethylene styrenated phenyl ether, A is an ethylene group, n=1 to 3, HLB value of 10.6), "NOIGEN (trade name) EA-137" (polyoxyethylene styrenated phenyl ether, cloud point of 65° C., HLB value of 6.3), "NOIGEN (trade name) EA-157" (polyoxyethylene styrenated phenyl ether, cloud point>80° C., HLB value of 14.3), "NOIGEN (trade name) EA-167" (polyoxyethylene styrenated phenyl ether, HLB value of 14.8), "NOIGEN (trade name) EA-177" (polyoxyethylene styrenated phenyl ether, HLB value of 15.6), "NOIGEN (trade name) EA-197D" (polyoxyethylene styrenated phenyl ether, HLB value of 17.5), and "NOIGEN (trade name) EA-207D" (polyoxyethylene styrenated phenyl ether, HLB value of 18.7) produced by DKS Co. Ltd.

To improve the fixation performance to glossy paper, it is preferred that the micelle-forming compound have a short oxyethylene chain and a small HLB value. Specifically, the HLB value is preferably in a range of 8 to 18, more preferably in a range of 9 to 16, and further preferably in a range of 10 to 15.

Using the micelle-forming compound having a higher cloud point is preferred because it hardly causes separation of the water-based ink and thus improves the preservation stability. Using the micelle-forming compound having more aryl groups is preferred because it has high hydrophobicity to enhance the compatibility with the resin, thereby further improving the fixation performance to glossy paper.

It is allowable that only one kind of the micelle-forming compound is used singly, or two or more kinds of the micelle-forming compounds are used in combination. The blending amount of the micelle-forming compound in the entire amount of the water-based ink is, for example, in a range of 0.1% by weight to 10% by weight, preferably in a range of 0.5% by weight to 5% by weight, and more preferably in a range of 1% by weight to 3% by weight.

According to the present teaching, adding the resin and the micelle-forming compound to the water-based pigment ink as described above can improve the fixation performance to glossy paper. Assumed mechanisms about the improvement of fixation performance of the water-based ink of the present teaching to glossy paper will be explained by using examples with reference to FIGS. 1 and 2. The mechanisms, however, are just assumptions and the present teaching is not limited to those.

Figure 1B:
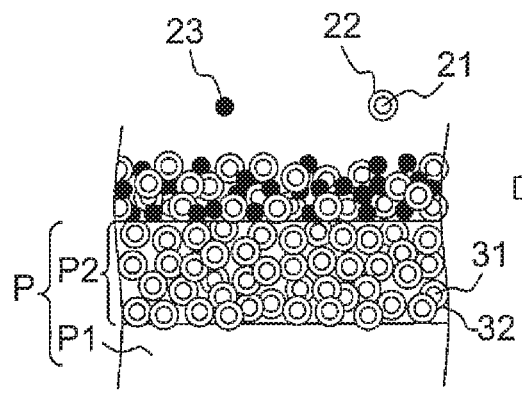
Figure 1C:
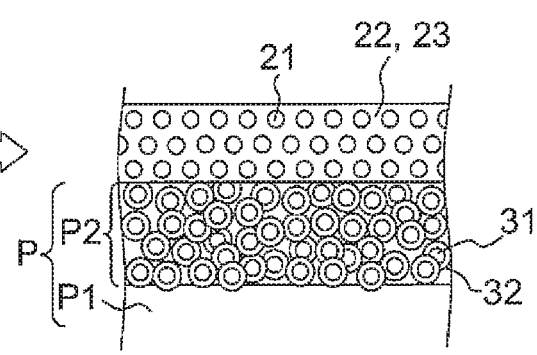

FIGS. 1A to 1C each illustrate an exemplary assumed mechanism about the improvement of fixation performance of resin-dispersible pigment ink to glossy paper, the resin-dispersible pigment ink being an exemplary water-based pigment ink. In this example, at least one of the water-soluble resin having the aryl group and the water-dispersible resin having the aryl group is used as the pigment dispersing resin. As depicted in FIGS. 1A to 1C, a glossy paper P is, for example, composed of a base paper P1; and a coating layer P2 which is made of particles 31, such as silica or alumina, covered with a binder resin 32 and which is stacked on a recording side of the base paper P1. As described above, the average of diameter sizes of typical voids of the coating layer P2 of the glossy paper P is in a range of about 10 nm to about 50 nm. Meanwhile, the typical average particle size of pigment particles 21 is about 100 nm. Thus, as depicted in FIG. 1A, when the water-based ink containing the pigment particles 21 covered with a pigment-dispersing resin 22 is discharged or jetted onto the glossy paper P, the pigment particles 21 covered with the pigment-dispersing resin 22 remain or stay on the surface of the glossy paper P without getting through the coating layer P2 of the glossy paper P. If the resin-dispersible pigment ink contains no micelle-forming compound of the present teaching, the pigment particles 21 covered with the pigment-dispersing resin 22 and deposited on the glossy paper P can not form a coating layer having sufficient strength and the coating film with insufficient strength is easily peeled off by being rubbed softly. On the other hand, as depicted in FIG. 1B, when the resin-dispersible pigment ink contains the micelle-forming compound of the present teaching, the micelle-forming compound forms micelles 23 in the water-based ink and thus the micelle-forming compound stays or remains on the surface of the glossy paper P without getting through the coating layer P2 of the glossy paper P. In particular, micelles 23 of the micelle-forming compound enter between the pigment particles 21 covered with the pigment-dispersing resin 22. The micelle-forming compound has the aryl group, and thus it has high compatibility with the pigment-dispersing resin 22 having the aryl group due to the interaction between π (pi) electrons. As a result, as depicted in FIG. 1(C), the micelle-forming compound dissolves the pigment-dispersing resin 22 to strongly connect the pigment particles 21 to each other. Accordingly, the fixation performance of the pigment particles 21 to the glossy paper P improves. It is preferred that the diameter of each micelle of the micelle-forming compound be in a range of about 10 nm to about 200 nm.

Figure 2A:
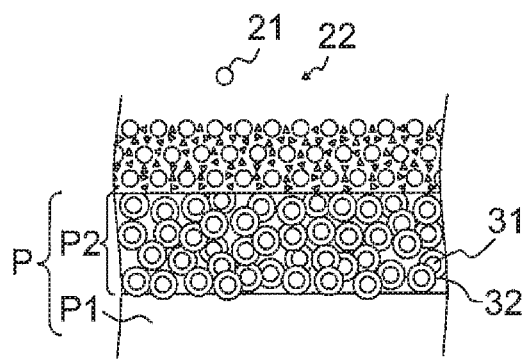
FIGS. 2A to 2C each illustrate another exemplary assumed mechanism about the improvement of fixation performance to glossy paper according to the present teaching.
Figure 2B:
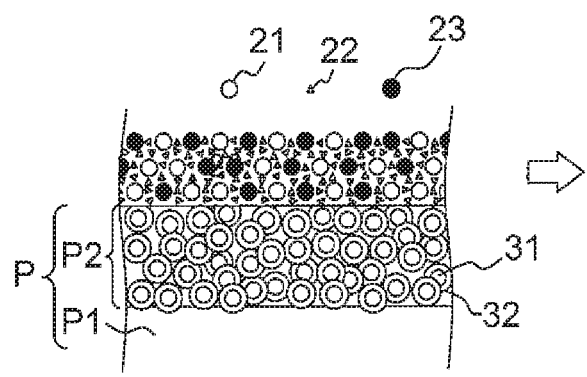
Figure 2C:
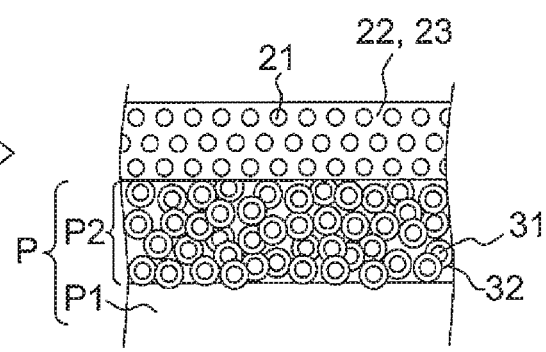

FIGS. 2A to 2C each illustrate an exemplary assumed mechanism about the improvement of the fixation performance of the self-dispersible pigment ink to glossy paper. As depicted in FIG. 2A, in the self-dispersible pigment ink, self-dispersible pigment particles 21 and resin 22 stay on the surface of the glossy paper P in a state of being mixed with each other. If the self-dispersible pigment ink contains no micelle-forming compound of the present teaching, the self-dispersible pigment particles 21 deposited on the glossy paper P can not form a coating layer having sufficient strength and the coating film with insufficient strength is easily peeled off by being rubbed softly. On the other hand, when the self-dispersible pigment ink contains the micelle-forming compound of the present teaching, three constituents including the self-dispersible pigment particles 21, the resin 22, and micelles 23 of the micelle-forming compound are mixed with one another on the glossy paper P. As a result, as depicted in FIG. 2C, the micelle-forming compound dissolves the resin 22 to strongly connect the self-dispersible pigment particles 21 to each other. Accordingly, the fixation performance to the glossy paper P improves. Except for the above, the assumed mechanism of the self-dispersible pigment ink is similar to that of the resin-dispersible pigment ink depicted in FIGS. 1A to 1C.

In order to improve the fixation performance of pigment particles to glossy paper, the ratio (weight ratio) (X/Y) of the blending amount (X: % by weight) of the micelle-forming compound in the water-based ink with respect to the blending amount (Y: % by weight) of the resin in the water-based ink is preferably in a range of 0.16 to 2.00, more preferably 0.33 to 2.00. Similarly, in order to improve the fixation performance of pigment particles to glossy paper, the ratio (weight ratio) (X/Z) of the blending amount (X: % by weight) of the micelle-forming compound in the water-based ink with respect to the blending amount (Z: % by weight) of the pigment in the water-based ink is preferably in a range of 0.12 to 0.50, more preferably 0.25 to 0.50. The micelle-forming compound is a kind of the surfactant. The surfactant may be contained in the water-based ink to adjust the surface tension of the water-based ink. When the surfactant is used for such a purpose such as the adjustment of surface tension of the water-based ink, satisfactory effect can be obtained by using a small amount of surfactant. As for the water-based ink of the present teaching, the micelle-forming compound forming micelles in the water-based ink is added to improve the fixation performance of pigment particles to glossy paper. When the surfactant is used for a purpose of improving the fixation performance of pigment particles to glossy paper, the blending amount of the micelle-forming compound in the water-based ink is preferably larger than the ease in which the surfactant is used for adjustment of surface tension of the water-based ink. Further, the ratio (X/Y) of the blending amount (X: % by weight) of die micelle-forming compound in the water-based ink with respect to the blending amount (Y: % by weight) of the resin in the water-based ink and the ratio (X/Z) of the blending amount (X: % by weight) of the micelle-forming compound in the water-based ink with respect to the blending amount (Z: % by weight) of the pigment in the water-based ink are preferably larger than the case in which the surfactant is used for adjustment of surface tension of the water-based ink.

The water-based ink may further contain a water-soluble organic solvent. The water-soluble organic solvent is exemplified, for example, by a humectant which prevents the water-based ink from drying at an end of a nozzle in an ink-jet head and a penetrant which adjusts the drying velocity on a recording medium.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene triethylene glycol, dipropylene glycol, tripropylene glycol, thiodiglycol, and hexylene glycol. It is allowable that only one kind of the humectant as described above is used singly, or two or more kinds of the humectants are used in combination.

The blending amount of the humectant in the entire amount of the water-based ink is, for example, in a range of 0% by weight to 95% by weight, preferably in a range of 5% by weight to 80% by weight, and more preferably in a range of 5% by weight to 50% by weight.

The penetrant includes, for example, glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. One kind of the penetrant may be used singly, or two or more kinds of the penetrants may be used in combination.

The blending amount of the penetrant in the entire amount of the water-based ink is, for example, in a range of 0% by weight to 20% by weight, preferably in a range of 0% by weight to 15% by weight, more preferably in a range of 1% by weight to 4% by weight.

From the viewpoint of improving the fixation performance to glossy paper, it is preferred that the water-based ink contain the water-soluble organic solvent having a small HLB value, in particular, the water-soluble organic solvent of which HLB value is not more than 8. Examples of the water-soluble organic solvent of which HLB value is not more than 8 include triethylene glycol-n-butyl ether (HLB value 8.0). The blending amount of the water-soluble organic solvent of which HLB value is not more than 8 in the entire amount of the water-based ink is, for example, in a range of 0.5% by weight to 20% by weight, preferably in a range of 1% by weight to 10% by weight, and more preferably in a range of 2% by weight to 6% by weight. The HLB value can be calculated, for example, by Davies' method.

The water-based ink may further contain a conventionally known additive, as necessary. The additive includes, for example, pH-adjusting agents, viscosity-adjusting agents, surface tension-adjusting agents, and fungicides. The viscosity-adjusting agents include, for example, polyvinyl alcohol, cellulose, and water-soluble resin.

The water-based ink can be prepared, for example, such that the pigment, water, the resin, the micelle-forming compound, and optionally other additive component(s) are mixed uniformly or homogeneously by any conventionally known method, and undissolved matters are removed by a filter or the like.

As described above, according to the present teaching, the fixation performance to glossy paper can be improved by allowing the water-based pigment ink to contain the micelle-forming compound and at least one of the water-soluble resin having the aryl group and the water-dispersible resin having the aryl group.

Next, the ink cartridge of the present teaching is characterized by being an ink cartridge containing a water-based ink for ink-jet recording; wherein the water-based ink for ink-jet recording is the water-based ink for ink-jet recording of the present teaching. For example, any conventionally known main body (body) of an ink cartridge can be used for the main body of the ink cartridge of the present teaching.

Next, according to the present teaching, there is provided a pigment fixation auxiliary agent which is characterized by containing the resin and the micelle-forming compound and which helps the fixation of the pigment contained in the water-based ink for ink-jet recording to glossy paper. Further, according to the present teaching, there is provided a kit including the pigment fixation auxiliary agent and the water-based ink for ink-jet recording which contains the pigment and water. The pigment fixation auxiliary agent may further contain any other component or constituent in the water-based ink than the pigment, such as water, the water-soluble organic solvent and the additive.

Next, explanation will be given about an ink-jet recording apparatus and an ink-jet recording method of the present teaching.

The ink-jet recording apparatus of the present teaching is an ink-jet recording apparatus characterized by including: an ink accommodating section configured to accommodate an ink therein; and an ink discharge mechanism configured to discharge the ink accommodated in the ink accommodating section; wherein the ink accommodated in the ink accommodating section is the water-based ink of the present teaching.

The ink-jet recording method of the present teaching is an ink-jet recording method characterized by including: performing recording on a recording medium by discharging, to the recording medium, a water-based ink by an ink-jet system; and using the water-based ink for ink-jet recording of the present teaching, as the water-based ink.

The ink-jet recording method of the present teaching can be practiced, for example, by using the ink-jet recording apparatus of the present teaching. The recording includes printing a letter (text), printing an image, printing, etc.

Figure 3:
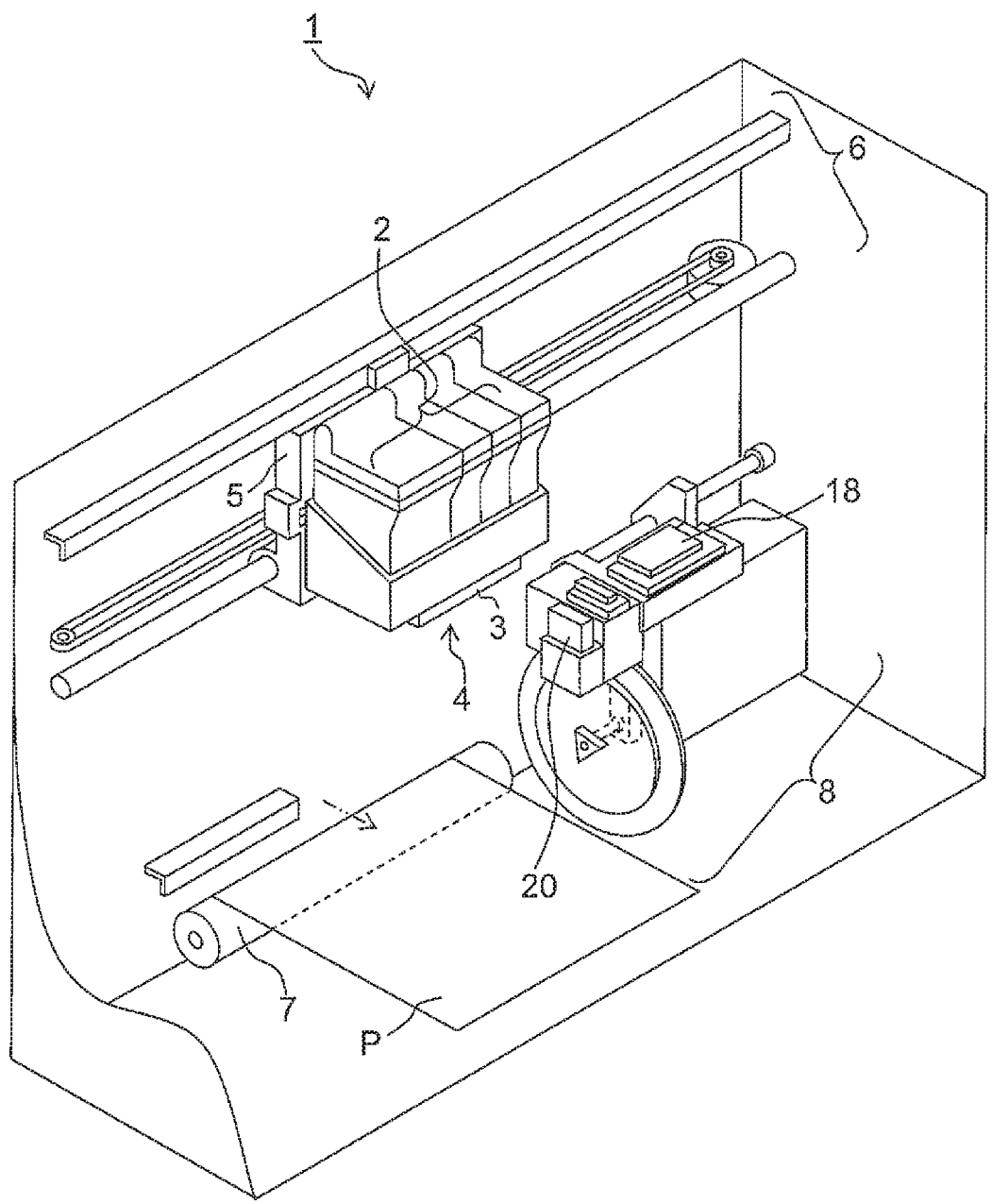
FIG. 3 is a schematic perspective view of an exemplary construction of an ink-jet recording apparatus according to the present teaching.

FIG. 3 depicts an exemplary configuration of the ink-jet recording apparatus of the present teaching. As depicted in FIG. 3, an ink-jet recording apparatus 1 of the present teaching includes four ink cartridges 2, an ink discharge mechanism (ink-jet head) 3, a head unit 4, a carriage 5, a driving unit 6, a platen roller 7 and a purge device 8 as main constitutive components or parts.

The four ink cartridges 2 contain four colors of water-based inks, respectively, the four colors being yellow, magenta, cyan and black. At least one water-based ink among the four color water-based inks is the water-based ink for ink-jet recording of the present teaching. The ink-jet head 3 disposed on the head unit 4 performs recording on a recording medium (for example, glossy paper) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc. accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 3, a cap 18 is provided to cover a plurality of nozzles of the ink-jet head 3 which is returned to a reset position upon completion of the recording, so as to prevent the water-based inks from drying.

In the ink-jet recording apparatus 1 of this embodiment, the four ink cartridges 2 are provided, together with the head unit 4, on one carriage 5. However, the present teaching is not limited to this. In the ink-jet recording apparatus 1, the respective four cartridges 2 may be provided on a carriage which is different (separate) from the carriage on which the head unit 4 is provided. Alternatively, the respective four cartridges 2 may be arranged and fixed inside the ink-jet recording apparatus 1, rather than being provided on the carriage 5. In such aspects, for example, each of the four cartridges 2 and the head unit 4 which is provided on the carriage 5 are connected with a tube, etc., and the water-based inks are supplied from the four cartridges 2, respectively, to the head unit 4 via the tubes.

Ink-jet recording using the ink-jet recording apparatus 1 is performed, for example, in the following manner. Namely, at first, the glossy paper P is supplied or fed from a feed cassette (not depicted in the drawing) arranged at a side of or at a position below the ink-jet recording apparatus 1. The glossy paper P is introduced or guided between the ink-jet head 3 and the platen roller 7. Then, a predetermined recording is performed on the fed or introduced glossy paper P with the water-based ink(s) discharged or jetted from the ink-jet head 3. The glossy paper P after the recording is discharged from the ink-jet recording apparatus 1. According to the present teaching, it is possible to obtain a recorded matter having a good fixation performance to the glossy paper P. In FIG. 3, the feed mechanism and discharge mechanism for the glossy paper P are omitted in the drawing.

In the apparatus depicted in FIG. 3, an ink-jet head of serial type (serial type ink-jet head) is adopted. However, the present teaching is not limited to this. The ink-jet recording apparatus may be an apparatus adopting an ink-jet head of line type (line type ink-jet head).

EXAMPLES

Next, examples of the present teaching will be explained together with comparative examples. Note that the present teaching is not limited and is not restricted to the examples and the comparative examples which will be described below.

Examples 1 to 14 and Comparative Examples 1 to 3

Components, except for a self-dispersible pigment, which were included in Water-based Ink Composition (TABLE 1) were mixed uniformly or homogeneously; and thus an ink solvent was obtained. Subsequently, the ink solvent was added to the self-dispersible pigment dispersed in water, followed by being mixed uniformly. After that, the obtained mixture was filtrated through a cellulose acetate membrane filter (pore size 3.00 μm) produced by Toyo Roshi Kaisha, Ltd., and thus the water-based ink for ink-jet recording of each of Examples 1 to 14 and Comparative Examples 1 to 3 was obtained.

Regarding the water-based inks of Examples 1 to 14 and Comparative Examples 1 to 3, evaluation of fixation performance to glossy paper was performed by the following method.

<Evaluation Method of Fixation Performance to Glossy Paper>

A digital multi-function peripheral equipped with an ink-jet printer "MFC-J4510N" manufactured by BROTHER KOGYO KABUSHIKI KAISHA was used to record an image including a single color patch on glossy paper (photo glossy paper "BP71GA4", exclusive or dedicated paper manufactured by BROTHER KOGYO KABUSHIKI KAISHA), with a resolution of 1200 dpi×2400 dpi, by using each of the water-based inks of Examples 1 to 14 and Comparative Examples 1 to 3. Thus, evaluation samples were produced. Each of the evaluation samples was rubbed with a rubber glove to which a constant load of $8\times10^3$ Pa was applied at predetermined time intervals. The rubbing-off on and around the rubbed part was observed visually in accordance with the following evaluation criteria. In the following evaluation criteria, "dirt" means color staining of the water-based ink which is caused by the water-based ink spreading over a non-recorded part of the glossy paper, and "rubbing-off" means a scratch (damage caused by rubbing) caused in a recorded part of the glossy paper.

<Evaluation Criteria for Evaluation of Fixation Performance to Glossy Paper>

AA: When the evaluation sample was rubbed after the elapse of one minute from its manufacture, no dirt and no rubbing-off were caused on and around the rubbed part.

A: When the evaluation sample was rubbed after the elapse of two minutes from its manufacture, no dirt and no rubbing-off were caused on and around the rubbed part.

A-: When the evaluation sample was rubbed after the elapse of five minutes from its manufacture, no dirt and no rubbing-off were caused on and around the rubbed part.

B: When the evaluation sample was rubbed after the elapse of five minutes from its manufacture, no dirt was caused but rubbing-off was caused on and around the rubbed part.

C: When the evaluation sample was rubbed after the elapse of five minutes from its manufacture, dirt and rubbing-off were caused on and around the rubbed part.

TABLE 1 shows the water-based ink compositions and the evaluation results of the water-based inks of Examples 1 to 14 and Comparative Examples 1 to 3.

TABLE 1

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Water-based Ink Composition (% by weight) | Pigment (Z) | Cab-o-jet (trade name) 465M (*1) | 4.00 | 4.00 | 4.00 | 4.00 | 4.00 | 4.00 | 4.00 | 4.00 | 4.00 | 4.00 |
| | Resin (Y) | JOHNCRYL (trade name) 537 (*2) | — | — | — | — | 2.00 | — | — | — | — | — |
| | | JOHNCRYL (trade name) 450 (*3) | — | — | — | — | — | 2.00 | — | — | — | 3.00 |
| | | JOHNCRYL (trade name) 60 (*4) | 2.00 | 2.00 | 1.00 | 3.00 | — | — | 3.00 | 3.00 | 3.00 | — |
| | | AQUALIC (trade name) DL-365 (*5) | — | — | — | — | — | — | — | — | — | — |
| | Micelle- | EMULGEN (trade name) A-60 (*6) | 2.00 | 2.00 | 2.00 | 2.00 | 2.00 | 2.00 | 1.50 | 1.00 | 0.50 | — |

TABLE 1-continued

|  |  |  | 1 | 2 | 3 | 4 | 5 | 6 | 7 | 8 | 9 | 10 |
|---|---|---|---|---|---|---|---|---|---|---|---|---|
|  | forming Compound (X) | NOIGEN (trade name) EA-87 (*7) | — | — | — | — | — | — | — | — | — | 2.00 |
|  |  | EMULGEN (trade name) A-90 (*8) | — | — | — | — | — | — | — | — | — | — |
|  |  | EMULGEN (trade name) A-500 (*9) | — | — | — | — | — | — | — | — | — | — |
|  | Water-soluble organic solvent | Triethylene glycol-n-butyl ether (*10) | 2.00 | — | 2.00 | 2.00 | 2.00 | 2.00 | 2.00 | 2.00 | 2.00 | 2.00 |
|  |  | Triethylene glycol (*11) | — | 2.00 | — | — | — | — | — | — | — | — |
|  | Humectant | 85% glycerol | 20.00 | 20.00 | 20.00 | 20.00 | 20.00 | 20.00 | 20.00 | 20.00 | 20.00 | 20.00 |
|  |  | Water | 70.00 | 70.00 | 71.00 | 69.00 | 70.00 | 70.00 | 69.50 | 70.00 | 70.50 | 69.00 |
|  |  | X/Y | 1.00 | 1.00 | 2.00 | 0.67 | 1.00 | 1.00 | 0.50 | 0.33 | 0.17 | 0.67 |
|  |  | X/Z | 0.50 | 0.50 | 0.50 | 0.50 | 0.50 | 0.50 | 0.38 | 0.25 | 0.13 | 0.50 |
| Fixation performance to glossy paper |  |  | AA | A | A | AA | A | AA | AA | A | A- | AA |

|  |  |  | Examples | | | | Comparative Examples | | |
|---|---|---|---|---|---|---|---|---|---|
|  |  |  | 11 | 12 | 13 | 14 | 1 | 2 | 3 |
| Water-based Ink Composition (% by weight) | Pigment (Z) | Cab-o-jet (trade name) 465M (*1) | 4.00 | 4.00 | 6.00 | 6.00 | 4.00 | 4.00 | 4.00 |
|  | Resin (Y) | JOHNCRYL (trade name) 537 (*2) | — | — | — | — | — | — | 3.00 |
|  |  | JOHNCRYL (trade name) 450 (*3) | 3.00 | 3.00 | — | — | — | — | — |
|  |  | JOHNCRYL (trade name) 60 (*4) | — | — | 2.00 | 3.00 | — | — | — |
|  |  | AQUALIC (trade name) DL-365 (*5) | — | — | — | — | — | 3.00 | — |
|  | Micelle-forming Compound (X) | EMULGEN (trade name) A-60 (*6) | — | — | 2.00 | 2.00 | 2.00 | 2.00 | — |
|  |  | NOIGEN (trade name) EA-87 (*7) | — | — | — | — | — | — | — |
|  |  | EMULGEN (trade name) A-90 (*8) | 2.00 | — | — | — | — | — | — |
|  |  | EMULGEN (trade name) A-500 (*9) | — | 2.00 | — | — | — | — | — |
|  | Water-soluble organic solvent | Triethylene glycol-n-butyl ether (*10) | 2.00 | 2.00 | 2.00 | 2.00 | 2.00 | 2.00 | 2.00 |
|  |  | Triethylene (*11) | — | — | — | — | — | — | — |
|  | Humectant | 85% glycerol | 20.00 | 20.00 | 20.00 | 20.00 | 20.00 | 20.00 | 20.00 |
|  |  | Water | 69.00 | 69.00 | 68.00 | 67.00 | 72.00 | 69.00 | 71.00 |
|  |  | X/Y | 0.67 | 0.67 | 1.00 | 0.67 | — | 0.67 | 0 |
|  |  | X/Z | 0.50 | 0.50 | 0.33 | 0.33 | 0.50 | 0.50 | 0 |
| Fixation performance to glossy paper |  |  | AA | A | A | AA | C | C | C |

LEGEND
(*1): Self-dispersible magenta pigment; produced by Cabot Corporation; numerals in TABLE 1 indicate piment solid content amounts
(*2): Water-dispersible resin (acrylic resin) having aryl group; produced by BASF Corporation; acid value of 40 mgKOH/g; numerals in TABLE 1 indicate solid content amounts
(*3): Water-dispersible resin (styrene acrylic resin) having aryl group; produced by BASF Corporation; acid value of 100 mgKOH/g; numerals in TABLE 1 indicate solid content amounts
(*4): Water-dispersible resin (acrylic resin) having aryl group; produced by BASF Corporation; acid value of 215 mgKOH/g; numerals in TABLE 1 indicate solid content amounts
(*5): Resin having no aryl group; produced by NIPPON SHOKUBAI CO., LTD.; acid value of 700 mgKOH/g; numeral in TABLE 1 indicates the solid content amount
(*6): Polyoxyethylene distyrenated phenyl ether; produced by Kao Corporation; cloud point of 61° C.; HLB value of 12.8
(*7): Polyoxyethylene styrenated phenyl ether; produced by DKS Co. Ltd.; HLB value of 10.6
(*8): Polyoxyethylene distyrenated phenyl ether; produced by Kao Corporation; cloud point of 90° C.; HLB value of 14.5
(*9): Polyoxyethylene distyrenated phenyl ether; produced by Kao Corporation; cloud point >100° C.; HLB value of 18.0
(*10): HLB value of 8.0
(*11): HLB value of 10.5

As shown in TABLE 1, regarding Examples 1 to 14, the evaluation results of fixation performance to glossy paper were good. Example 1, in which the water-soluble organic solvent having a HLB value of not more than 8 was used, had a better evaluation result of fixation performance to glossy paper than that of Example 2, in which the same conditions as Example 1 were adopted except the use of the water-soluble organic solvent having a HLB value exceeding 8. Each of Examples 1 and 6, in which the resin having an acid value of not less than 100 mgKOH/g was used, had a better evaluation result of fixation performance to glossy paper than that of Example 5, in which the same conditions as Examples 1 and 6 were adopted except the use of the resin having an acid value of less than 100 mgKOH/g. Each of Examples 10 and 11, in which the micelle-forming compound having a HLB value of 10 to 15 was used, had a better evaluation result of fixation performance to glossy paper than that of Example 12, in which the same conditions as Examples 10 and 11 were adopted except the use of the micelle-forming compound having a HLB value exceeding 15. Further, in each of Examples 1 to 14, the ratio (X/Y) of the blending amount (X: % by weight) of the micelle-forming compound in the water-based ink with respect to the blending amount (Y: % by weight) of the resin in the water-based ink was in a range of 0.16 to 2.00, and the ratio (X/Z) of the blending amount (X: % by weight) of the micelle-forming compound in the water-based ink with respect to the blending amount (Z: % by weight) of the pigment in the water-based ink was in a range of 0.12 to 0.50. Regarding each of Examples 1 to 8 and 10 to 14 having a better evaluation result of fixation performance to glossy paper, the ratio (X/Y) of the blending amount (X: % by weight) of the micelle-forming compound in the water-based ink with respect to the blending amount (Y: % by weight) of the resin in the water-based ink was in a range of 0.33 to 2.00, and the ratio (X/Z) of the blending amount (X: % by weight) of the micelle-forming compound in the water-based ink with respect to the blending amount (Z: % by weight) of the pigment in the water-based ink was in a range of 0.25 to 0.50.

Regarding Comparative Example 1 in which no resin was used, Comparative Example 2 in which the resin having no aryl group was used, and Comparative Example 3 in which no micelle-forming compound was used, the evaluation results of fixation performance to glossy paper were bad.

As described above, the water-based ink of the preset teaching has excellent fixation performance to glossy paper. The way of use of the water-based ink of the present teaching is not particularly limited, and the water-based ink is widely applicable to various types of ink-jet recording.

What is claimed is:
1. A water-based ink for ink-jet recording comprising:
a pigment;
water;
a water-soluble resin having an aryl group, a water-dispersible resin having an aryl group, or both; and a micelle-forming compound having an aryl group and an oxyethylene chain;
wherein a weight ratio (X/Y) of a blending amount (X) of the micelle-forming compound to a total blending amount (Y) of the water-soluble resin and the water-dispersible resin in the water-based ink is in a range of 0.16 to 2.00.

2. The water-based ink for ink-jet recording according to claim 1, wherein the micelle-forming compound has a HLB value in a range of 10 to 18.

3. The water-based ink for ink-jet recording according to claim 2, wherein the micelle-forming compound has a HLB value in a range of 10 to 15.

4. The water-based ink for ink-jet recording according to claim 1, further comprising a water-soluble organic solvent having a HLB value of not more than 8.

5. The water-based ink for ink-jet recording according to claim 4, wherein the water-soluble organic solvent is triethylene glycol-n-butyl ether.

6. The water-based ink for ink-jet recording according to claim 1, wherein the micelle-forming compound is a compound represented by the following formula (1):

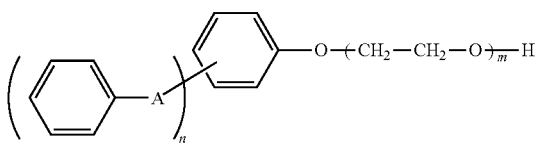

in the formula (1),
A is a single bond, or a straight or branched chain alkylene group having 1 to 10 carbon atoms;
m is an integer in a range of 10 to 100; and
n is an integer in a range of 1 to 5.

7. The water-based ink for ink-jet recording according to claim 1, wherein the water-soluble resin having the aryl group, the water-dispersible resin having the aryl group, or both, is an acrylic resin forming emulsion or a styrene acrylic resin forming emulsion, and the micelle-forming compound is a compound represented by the formula (1):

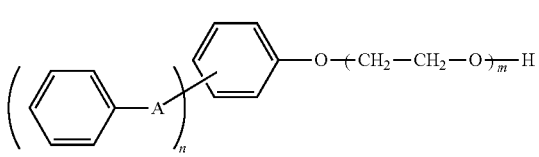

in the formula (1),
A is a straight or branched chain alkylene group having 2 carbon atoms;
m is an integer in a range of 10 to 100; and
n is an integer in a range of 1 to 3.

8. The water-based ink for ink-jet recording according to claim 1, wherein the at least one of the water-soluble resin having the aryl group and the water-dispersible resin having the aryl group has an acid value of not less than 100 mgKOH/g.

9. The water-based ink for ink-jet recording according to claim 1, wherein the at least one of the water-soluble resin having the aryl group and the water-dispersible resin having the aryl group is an acrylic resin or a styrene acrylic resin.

10. The water-based ink for ink-jet recording according to claim 1, wherein the water-soluble resin having the aryl group, the water-dispersible resin having the aryl group, or both, has a minimum film-forming temperature of not more than 80° C.

11. The water-based ink for ink-jet recording according to claim 1, wherein the water-soluble resin having the aryl group, the water-dispersible resin having the aryl group, or both, is a water-dispersible resin forming emulsion.

12. The water-based ink for ink-jet recording according to claim 11, wherein the water-dispersible resin forming the emulsion has an average particle size of not more than 200 nm.

13. The water-based ink for ink-jet recording according to claim 1, wherein the weight ratio (X/Y) of the blending amount (X) of the micelle-forming compound to the total blending amount (Y) of the water-soluble resin and the water-dispersible resin in the water-based ink is in a range of 0.33 to 2.00.

14. The water-based ink for ink-jet recording according to claim 1, wherein a weight ratio (X/Z) of the blending amount (X) of the micelle-forming compound to a blending amount (Z) of the pigment in the water-based ink is in a range of 0.12 to 0.50.

15. The water-based ink for ink-jet recording according to claim 1, wherein a weight ratio (X/Z) of the blending amount (X) of the micelle-forming compound to a blending amount (Z) of the pigment in the water-based ink is in a range of 0.25 to 0.50.

16. An ink cartridge which comprises the water-based ink for ink-jet recording as defined in claim 1.

17. An ink-jet recording method comprising
discharging a water-based ink for ink-jet recording on a glossy paper in accordance with an ink-jet system to perform recording,
wherein the water-based ink for ink-jet recording is the water-based ink for ink-jet recording as defined in claim 1.

* * * * *